(12) United States Patent
Cherney

(10) Patent No.: US 11,008,056 B2
(45) Date of Patent: May 18, 2021

(54) ISOLATION SYSTEM FROM NOISE AND VIBRATIONS FOR A WORK VEHICLE

(71) Applicant: Deere & Company, Moline, IL (US)

(72) Inventor: Mark J. Cherney, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 184 days.

(21) Appl. No.: 16/018,944

(22) Filed: Jun. 26, 2018

(65) Prior Publication Data

US 2019/0389521 A1 Dec. 26, 2019

(51) Int. Cl.
*B62D 55/108* (2006.01)
*B62D 55/096* (2006.01)

(52) U.S. Cl.
CPC ......... *B62D 55/108* (2013.01); *B62D 55/096* (2013.01)

(58) Field of Classification Search
CPC .............................. B62D 55/096; B62D 55/108
USPC ......................................................... 180/9.52
See application file for complete search history.

(56) References Cited

U.S. PATENT DOCUMENTS

| 3,917,016 | A | | 11/1975 | Stoufflet | |
|---|---|---|---|---|---|
| 3,952,826 | A | * | 4/1976 | Barker | B62D 53/02 180/420 |
| 5,725,066 | A | * | 3/1998 | Beard | B60G 17/0152 180/89.12 |
| 6,478,102 | B1 | | 11/2002 | Puterbaugh et al. | |
| 7,849,983 | B2 | | 12/2010 | St. Clair et al. | |
| 7,938,478 | B2 | | 5/2011 | Kamimae | |
| 9,238,902 | B2 | * | 1/2016 | Meinders | E02F 5/08 |
| 10,065,690 | B2 | * | 9/2018 | Summer | B62D 55/108 |
| 10,266,027 | B2 | * | 4/2019 | Enomoto | B60G 11/16 |
| 2012/0073843 | A1 | | 3/2012 | Kure | |

FOREIGN PATENT DOCUMENTS

| CN | 205205896 U | 5/2016 |
|---|---|---|
| DE | 1944196 U | 8/1966 |
| DE | 154596 A1 | 4/1982 |
| DE | 102008045492 B4 | 8/2013 |

(Continued)

OTHER PUBLICATIONS

German Search Report issued in counterpart application No. 102019208781.7 dated May 11, 2020 (10 pages).

*Primary Examiner* — Jacob D Knutson
*Assistant Examiner* — Felicia L. Brittman
(74) *Attorney, Agent, or Firm* — Taft Stettinius & Hollister LLP; Stephen F. Rost

(57) ABSTRACT

An isolation system for a vehicle having a rear frame attached to a front frame. The rear frame supports a greater portion of a total force applied to the vehicle than the front frame. The isolation system includes at least one isolating device positioned between the rear and front frames. The isolating device supports a portion of the total force applied to the vehicle in a direction in which the isolating devices is positioned. The isolation system includes a force limiting device positioned near the isolating device and a motion limiting torque rod attached to the rear and front frames. The force limiting device limits the amount of load applied to the isolating device above a maximum load. The motion limiting torque rod prevents or limits movement of the rear frame relative to the front frame in the direction in which it is aligned.

20 Claims, 5 Drawing Sheets

(56) References Cited

FOREIGN PATENT DOCUMENTS

| EP | 3127790 A1 | 2/2017 |
|---|---|---|
| FR | 1013365 A | 7/1952 |
| JP | H05255951 A | 10/1993 |
| WO | WO 2005054043 A1 | 6/2005 |

* cited by examiner

ISOLATION SYSTEM FROM NOISE AND VIBRATIONS FOR A WORK VEHICLE

FIELD OF THE DISCLOSURE

The present disclosure relates to an isolation system for a work machine, and in particular the isolation system located between a rear frame and a front frame of the work machine.

BACKGROUND OF THE DISCLOSURE

Work machines such as bulldozers often have a significant amount of noise and vibration during operation of the machine. Bulldozers also have a significant amount of force or load that is applied to the various parts of the machine. Bulldozers typically include a vehicle body and track-type undercarriages mounted to the right and left sides of the vehicle body. Bulldozers also include other mechanisms such as drive gears and hydrostatic transmissions for operation of the track-type undercarriages. Each of the drive gears, hydrostatic transmissions, track type undercarriages, front work implement, rear work implement, and other mechanisms operate at their own noise and frequency or vibration levels. All of these parts are bolted or attached to the vehicle body therefore all of the various noises and vibrations are channeled through the vehicle body to cause noise and vibration for the operator of the work machine. Moreover the vehicle body must be designed to withstand heavy loads or forces applied due to these parts. Bulldozers typically have little or inadequate sound or vibration isolation from these mechanisms to the main frame and cab where the operator sits. Therefore an operator sitting in the cab is often uncomfortable and thereby less productive over time.

Therefore, further improvements in this technology area are needed to address these issues, among others.

SUMMARY

According to one embodiment of the present disclosure, an isolation system for a work vehicle having a rear frame operably attached to a front frame, the work vehicle having a vertical axis, a lateral axis, and a longitudinal axis, the isolation system comprising at least one isolating device positioned between the rear frame and the front frame, the at least one isolating device configured to support at least one of a longitudinal force or a vertical force from a total force applied to the work vehicle during operation of the work vehicle; a force limiting device positioned near the at least one isolating device; and a motion limiting torque rod attached to the rear frame and the front frame, the motion limiting torque rod configured to prevent movement of the rear frame in the lateral direction.

In one example, the isolation system further comprises a second isolating device positioned to support the other one of the longitudinal force or the vertical force. In a further example of this embodiment, the isolation system includes a second force limiting device positioned near the second isolating device.

In another example of the isolation system the force limiting device is configured to limit application of either the longitudinal force or the vertical force that is applied to the at least one isolating device.

In a fourth example of the isolation system further comprises a rear frame configured to support a greater portion of a total force during operation of the work vehicle than the front frame.

In a fifth example of the isolation system the at least one isolating device includes a rubber isolating device.

According to another embodiment of the present disclosure, a work vehicle having a vertical axis, a lateral axis, and a longitudinal axis, the work vehicle having a front frame, the work vehicle comprises a rear frame configured to support a total force applied to the work vehicle during operation of the work vehicle, the rear frame attached to the front frame; an isolation system mounted between the rear frame and the front frame, the isolation system including: one or more isolating devices positioned between the rear frame and the front frame, the one or more isolating devices configured to support at least one of a longitudinal force or a vertical force from the total force applied to the work vehicle; a force limiting device positioned adjacent the one or more isolating devices; and a motion limiting torque rod attached between the rear frame and the front frame, the motion limiting torque rod configured to limit movement of the rear frame in one of a lateral direction, a longitudinal direction, or a vertical direction.

In one example of this embodiment, the one or more isolating devices includes two isolating devices positioned to support the vertical force.

In a second example of this embodiment, the force limiting device is positioned between the two isolating devices.

In a third example of this embodiment, the force limiting device is positioned offset from the two isolating devices.

In a fourth example of this embodiment, the one or more isolating devices includes a second isolating device positioned to support the longitudinal force.

In a fifth example of this embodiment, the work vehicle further comprises a second force limiting device positioned adjacent the second isolating device.

In a sixth example of this embodiment, the rear frame is configured to support a greater portion of the total force applied to the work vehicle during operation than the front frame is configured to support.

In a seventh example of this embodiment, the force limiting device is configured to limit application of either the longitudinal force or the vertical force that is applied to the one or more isolating devices.

According to another embodiment of the present disclosure, an isolation system for a work vehicle having a rear frame operably attached to a front frame, the work vehicle having a vertical axis, a lateral axis, and a longitudinal axis, the isolation system comprising: one or more isolating devices positioned between the rear frame and the front frame, each of the one or more isolating devices having an isolating device axis wherein each of the one or more isolating devices is configured to enable movement of the rear frame relative to the front frame in a direction along the corresponding isolating device axis during operation of the work vehicle; and a motion limiting torque rod attached to both of the rear frame and the front frame, the motion limiting torque rod configured to prevent movement of the rear frame in a direction other than the isolating device axis.

In one example of this embodiment, the isolation system further comprises a force limiting device is positioned near the one or more isolating devices.

In a second example of this embodiment, the one or more isolating devices includes a second isolating device that has a second isolating device axis, wherein the second isolating device axis is different than the first isolating device axis of the one of more isolating devices.

In a third example of this embodiment, the isolation system further comprises a second force limiting device positioned adjacent to the second isolating device.

In a fourth example of this embodiment, the isolation system further comprises a rear frame configured to support greater portion of a total force applied to the work vehicle during operation of the work vehicle than the front frame.

In a fifth example of this embodiment, each of the one or more isolating devices is configured to support a force in a direction along the isolating device axis from a total force during operation of the work vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
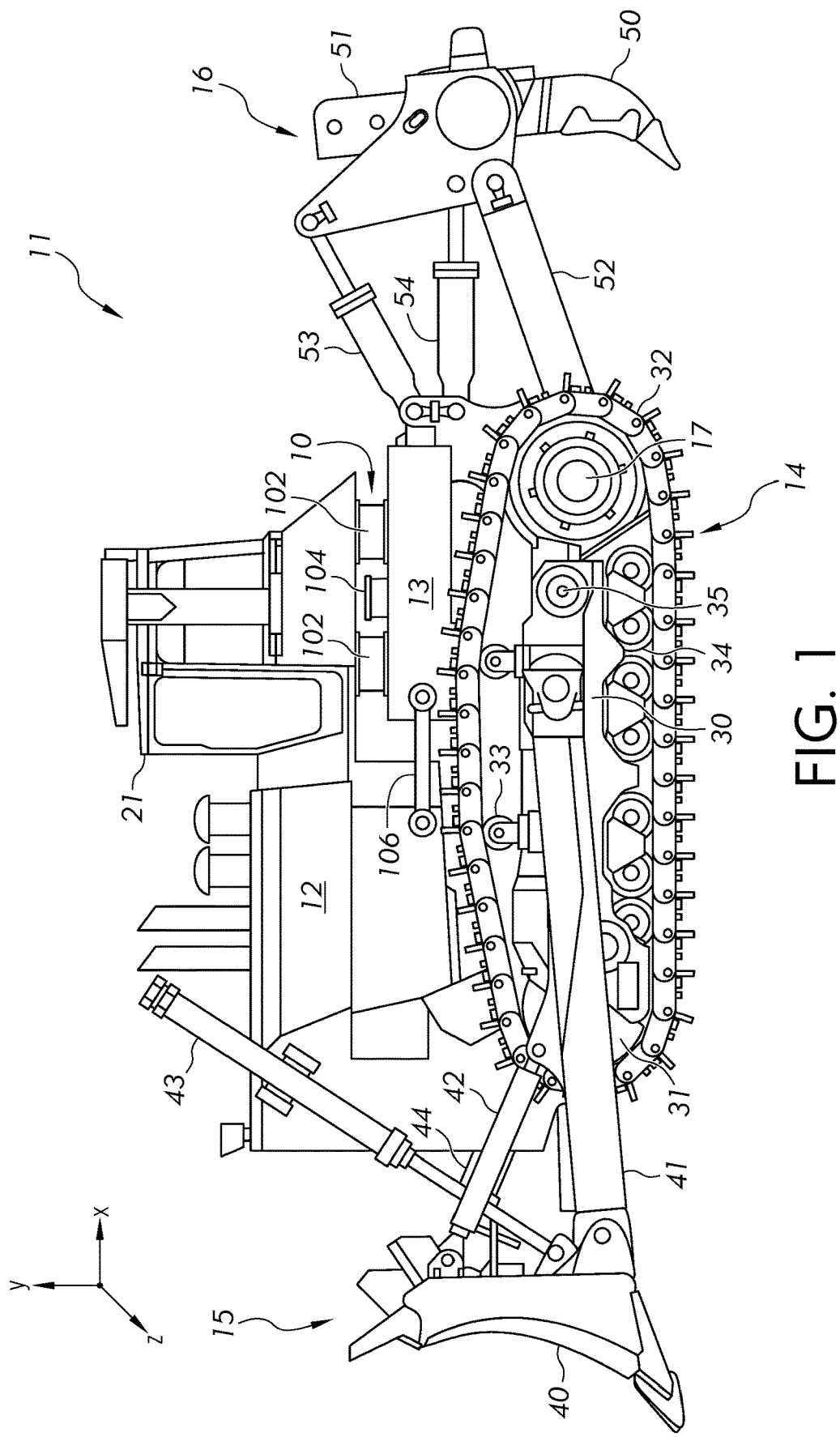
FIG. 1 is a side view of a work vehicle to which an isolating system is mounted.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring now to FIG. 1, an isolation system 10 for a work vehicle 11 will be described. Although the isolation system 10 is applied to a bulldozer that serves as a work vehicle, the isolation system 10 can be applied to other types of work vehicles. The work vehicle 11 includes a longitudinal axis X, a vertical axis Y, and a lateral axis Z. When the terms "longitudinal direction", "vertical direction", and "lateral direction" are used herein, it should be understood that these terms are coincident with the longitudinal (front-back) axis X, vertical axis Y, and lateral axis Z directions as illustrated unless otherwise noted.

FIG. 1 shows a bulldozer 11 including a front frame 12 having a cab 21 that constitutes an operator's cab and a rear frame 13; a right and a left track-type undercarriages 14, 14' provided on the left and right sides of the front frame 12 and the rear frame 13 (only the left undercarriage is shown); a blade implement 15 mounted to the front frame 12, and a ripper implement 16 disposed behind or mounted on the rear frame 13.

The front frame 12 is a lighter duty chassis frame and the rear frame 13 is a heavy duty axle frame. The rear frame 13 is configured to support a greater portion of a total force applied to the bulldozer 11 during operation of the bulldozer 11 than the front frame 12. As such, the rear frame 13 is configured to structurally support a larger amount of the total force applied to the bulldozer 11 which as used herein refers to the rear frame 13 being a heavy duty frame. The rear frame 13 is separate from the front frame 12 but operably connected to the front frame 12 via the isolation system 10 and other means (not illustrated). In one form, the rear frame 13 is made of a steel or other material capable of supporting any applied loads to the work vehicle 11. The front frame 12 and the rear frame 13 are configured to receive the isolation system 10 therebetween.

Figure 2:
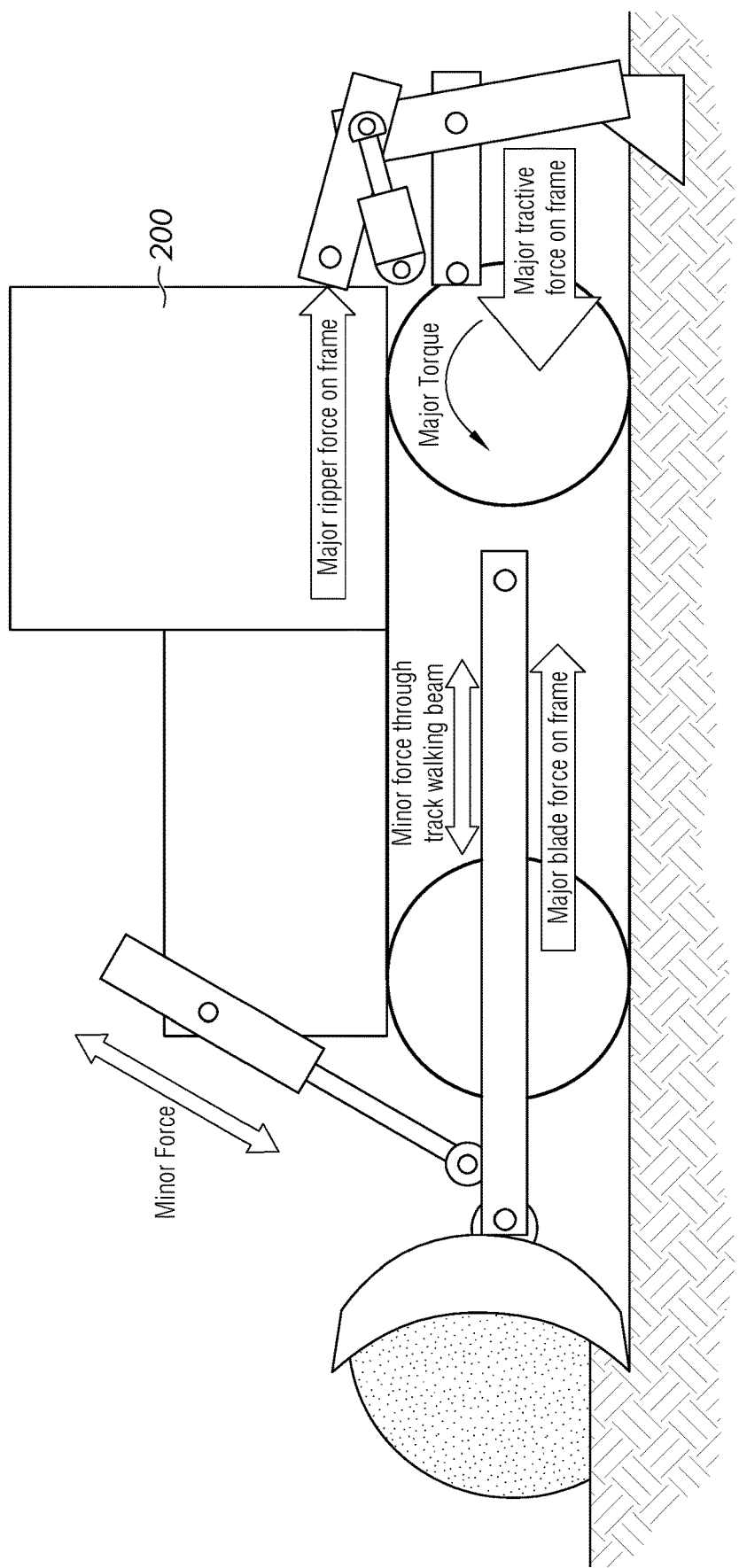
FIG. 2 is a side view of a conventional work vehicle illustrating forces that act upon the work vehicle during operation.

Illustrated in FIG. 2 is a diagram of forces that occur on a conventional bulldozer 200. Although a conventional bulldozer is illustrated, similar forces would also occur on the work vehicle 11. For example, some of the forces include forces from a blade implement, blade lift cylinders, equalizer or walking bar (not illustrated), a sprocket wheel, a track belt, a ripper implement, and other forces not listed that act upon the bulldozer 200 during operation or movement of the bulldozer 200. All forces applied to the bulldozer 200 during operation of the bulldozer 200 will be resolved through the frame of the bulldozer 200.

Applicant has found that most of the loads on the work vehicle 11 can be resolved at the rear of the vehicle. The rear of the vehicle is where the loads from the blade get transferred to the frame thru the track pivot, the final drive applies torque to the tracks/frame, and the ripper loads are applied to the frame. Therefore in the present application, it was determined that separation of the rear frame 13 from the front frame 12 is beneficial to save costs as the rear frame 13 is designed as a heavy duty axle frame to resolve most of the large loads on the work vehicle 11. Moreover, the rear frame 13 is isolated via the isolation system 10 from the front frame 12 to reduce the noise and vibration that occurs from forces that act upon the work vehicle 11 during operation. The front frame 12 can be designed as a lighter duty chassis frame.

Although not illustrated, the front frame 12 and the rear frame 13, constitute the framework of the work vehicle 11. The front frame 12 and the rear frame 13 span longitudinally and are aligned with a spacing therebetween for the isolation system 10. The rear frame 13 is configured to receive a pivotal shaft or track pivot 35 and a final drive with a rear sprocket 17. Other forms of connecting the front frame 12 and the rear frame 13 are within the scope of this application.

Each of the undercarriages 14, 14' has a track frame 30 that constitutes the framework for the undercarriages 14, 14'. The track frames 30 are located in front of their associated sprocket wheels 17 respectively, extending in a front-back direction. In front of each track frame 30, an idler tumbler 31 is rotatably mounted as an idler wheel. Wound around the idler tumbler 31 and the sprocket wheel 17 is a track belt 32 that works as an endless track. Provided on the upper surface side of each track frame 30 are a desired number of carrier rollers 33. The carrier rollers 33 support the track belt 32 from the underside thereof, while the track belt 32 moving in a direction from the sprocket wheel 17 to the idler tumbler 31 or in a direction opposite thereto, so that the carrier rollers 33 function to prevent hanging of the track belt 32 due to its own weight and meandering of the track belt 32. Provided on the lower surface side of each track frame 30 is a desired number of track rollers 34. The track rollers 34 function to dispersedly transmit the weight of the vehicle body to the track belt 32 and prevent meandering of the track belt 32.

In each of the undercarriages 14, 14', the rear part of the track frame 30 is supported by a pivotal shaft 35. Each of the pivotal shafts 35 has an axis that horizontally extends in a lateral direction and is attached to a side surface of the rear frame 13 so as to project outward. The undercarriages 14, 14' can freely pitch about their associated pivotal shafts 35 each of which has a horizontal pivotal axis. A suspension device (not illustrated) is mounted to the work vehicle 11. The suspension device includes a walking beam for coupling the left undercarriage 14 (located on the left hand) and the right undercarriage 14' (located on the right hand) to each other. The movement of the track frame 30 is typically constrained by the suspension device or walking beam.

Turning now to the blade implement 15, the blade implement 15 has a blade 40 located anterior to the front frame 12. The blade 40 is used for operations such as digging, earth carrying, banking and ground leveling. The blade 40 is supported at a right angle to a traveling direction of the work vehicle 11 by means of straight frames 41 that are attached to the right and left pair of track frames 30 respectively so as to be freely raised, a brace 42 for coupling the left straight frame 41 (that appears on the plane of FIG. 1) to the blade 40, an arm (not shown) and others.

The blade 40 is coupled to the front frame 12 by blade lift cylinders 43. The blade 40 can be lifted by causing the blade lift cylinders 43 to contract. The blade 40 can be lowered by causing the blade lift cylinders 43 to expand. The blade 40 is coupled to the right straight frame 41 (that is kept out of sight in FIG. 1) by a blade tilt cylinder 44. By operating the blade tilt cylinder 44, the blade 40 can be inclined (tilting).

The ripper implement 16 has a ripper 50 located posterior to the rear frame 13. The ripper 50 is used for not only digging earth but also crushing rocks. The ripper 50 is detachably mounted to a ripper mounting bracket 51. The ripper mounting bracket 51 and the rear frame 13 are coupled to each other by means of an arm 52, ripper tilt cylinders 53 and ripper lift cylinders 54.

The four elements, the ripper mounting bracket 51, the rear frame 13, the arm 52 and the ripper tilt cylinders 53 constitute a four bar linkage. The ripper 50 can be lifted or lowered without changing its pose relative to the ground by causing the ripper lift cylinders 54 to contract or expand. In addition, the digging angle of the ripper 50 can be corrected through the operation of the ripper tilt cylinders 53 thereby effectively performing digging-up operation by the ripper 50.

The isolation system 10 provides isolation from the loads, noise, frequencies, and vibrations due to the right and a left track-type undercarriages 14, 14', the blade implement 15, and the ripper implement 16 to the operator in the cab 21 during operation of the work vehicle 11.

The isolation system 10 includes one or more isolating devices 102 positioned between the rear frame 13 and the front frame 12. In any form, the isolating devices 102 can include one or more or one, two, three, or more isolating devices 102 arranged in any desired configuration that is beneficial to absorb forces or loads applied to the work vehicle 11 and noise resultant therefrom. The one or more isolating devices 102 are configured to support at least one of or a combination of a longitudinal force, a lateral force, and/or a vertical force from a total force applied to the work vehicle 11 during operation of the work vehicle 11. Moreover, the one or more isolating devices 102 allow movement of front frame 12 relative to the rear frame 13 in a direction that is determined based on how the isolating devices 102 are positioned relative to the front and rear frames 12 and 13, respectively. In one form, the isolating devices 102 are rubber isolating devices that have alternating layers of rubber and steel. Alternatively, the isolating devices 102 include springs, coil springs, leaf springs, shock absorbers, and other dampening systems.

The isolation system 10 includes a force limiting device 104 positioned between two of the isolating devices 102. The force limiting device 104 prevents forces from the axis in which it is aligned from being applied to the isolating devices 102. Some examples of force limiting devices 104 include a mechanical hard stop or a rubber bumper.

The isolation system 10 also includes a motion limiting torque rod 106 attached to the rear frame 13 and the front frame 12 wherein the motion limiting torque rod 106 is configured to prevent movement of the rear frame 13 in one of the longitudinal direction, the lateral direction, and/or the vertical direction. Generally, the motion limiting torque rod 106 is applied to limit the range of motion of the rear frame 13 in certain axes in which it is positioned. The motion limiting torque rod 106 allows the rear frame 13 to move vertically along the vertical axis Y and limited movement longitudinally along the longitudinal axis X via rubber bushings in torque rod 106. The motion limiting torque rod 106 includes a rubber bushing embedded at both ends wherein the motion limiting torque rod 106 limits motion in a single axis.

Figure 3:
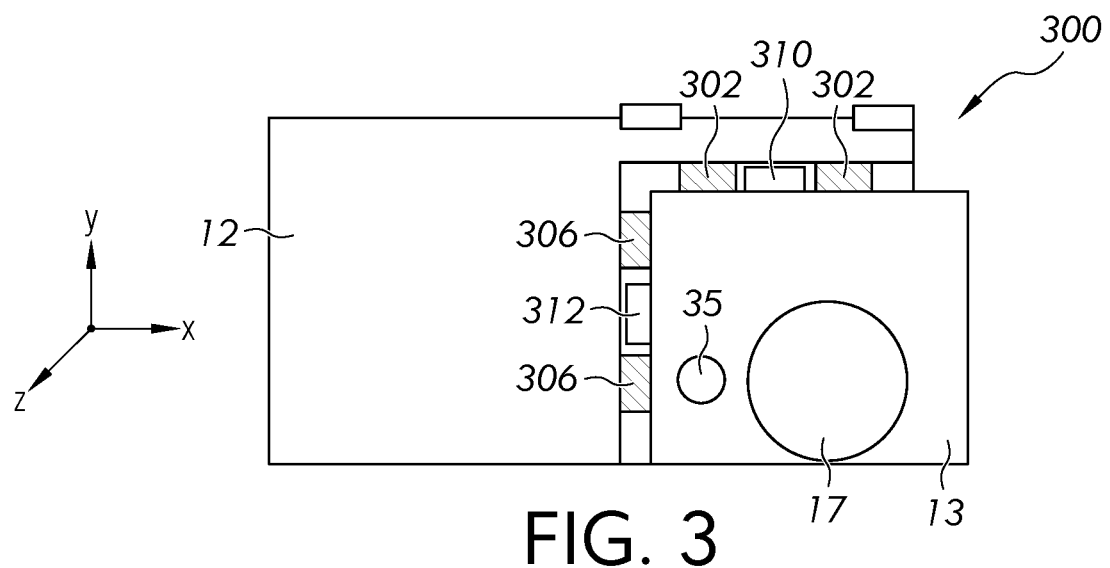
FIG. 3 is a side view of a first isolation system for the work vehicle of FIG. 1 having a rear frame and a front frame.
Figure 4:
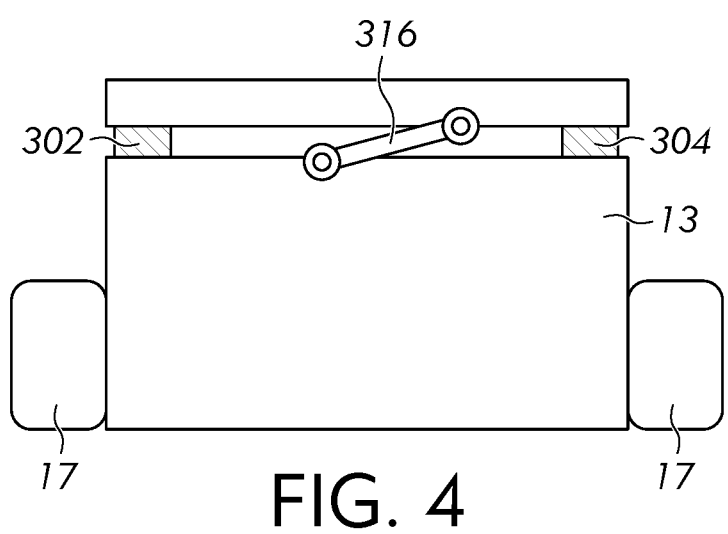
FIG. 4 is an end view of the FIG. 3 embodiment.

Turning now to FIGS. 3 and 4, is an isolation system 300 similar to the isolation system 10. The isolation system 300 includes a first pair of isolating devices 302 positioned and spaced apart from each other along the longitudinal axis X and along the left side of the work vehicle 11 as defined by the lateral axis Z. The isolation system 300 includes a second pair of the isolating devices 304 positioned and spaced apart from each other along the longitudinal axis X and along the right side of the work vehicle 11 as defined by the lateral axis Z. The isolation system 300 includes a third pair of the isolating devices 306 positioned and spaced apart from each other along the vertical axis Y of the work vehicle 11. The isolating devices 302, 304, and 306 are similar to isolating devices 102. The isolating devices 302, 304, and 306 can be arranged in any configuration that is beneficial to absorbing forces or loads applied to the work vehicle 11 and noise resultant therefrom. In this embodiment, the first and second pairs of isolating devices 302 and 304 are positioned to support the vertical forces from the total force applied to the work vehicle 11. The first and second pairs of isolating devices 302 and 304 allow movement of front frame 12 relative to the rear frame 13 in a vertical direction. The third pair of isolating devices 306 is positioned to support the longitudinal forces from the total force applied to the work vehicle 11. The third pair of isolating devices 306 allow movement of front frame 12 relative to the rear frame 13 in a longitudinal direction. In other words, isolating devices 302, 304, and 306 support mostly a compressive load in the direction they are oriented.

The isolation system 300 includes a first force limiting device 310 positioned between the first pair of isolating devices 302 and a second force limiting device (not illustrated) positioned between the second pair of isolating devices 304. The isolation system 300 also includes a third force limiting device 312 positioned between the third pair of isolating devices 306. The first, second, and third force limiting devices are similar to each other and are each configured to limit application of a force applied to the corresponding pair of isolating devices. The first and second force limiting devices are positioned to limit the vertical force that is applied to the first and second pair of isolating devices. The third force limiting device is positioned to limit the longitudinal force that is applied to the third pair of isolating devices 306. The first, second, and third force limiting devices can be positioned adjacent or near the isolating devices 302, 304, 306. It is not necessary to place the force limiting device between two isolating devices.

The isolation system 300 includes a motion limiting torque rod 316 that attaches to the rear frame 13 and to the front frame 12 and extends generally along the lateral axis Z. The motion limiting torque rod 316 is configured to prevent movement of the rear frame 13 in a direction relative to the front frame 12. In this form, the motion limiting torque rod 316 is positioned to limit or prevent movement of the rear frame 13 in the lateral direction relative to the front frame 12.

Figure 5:
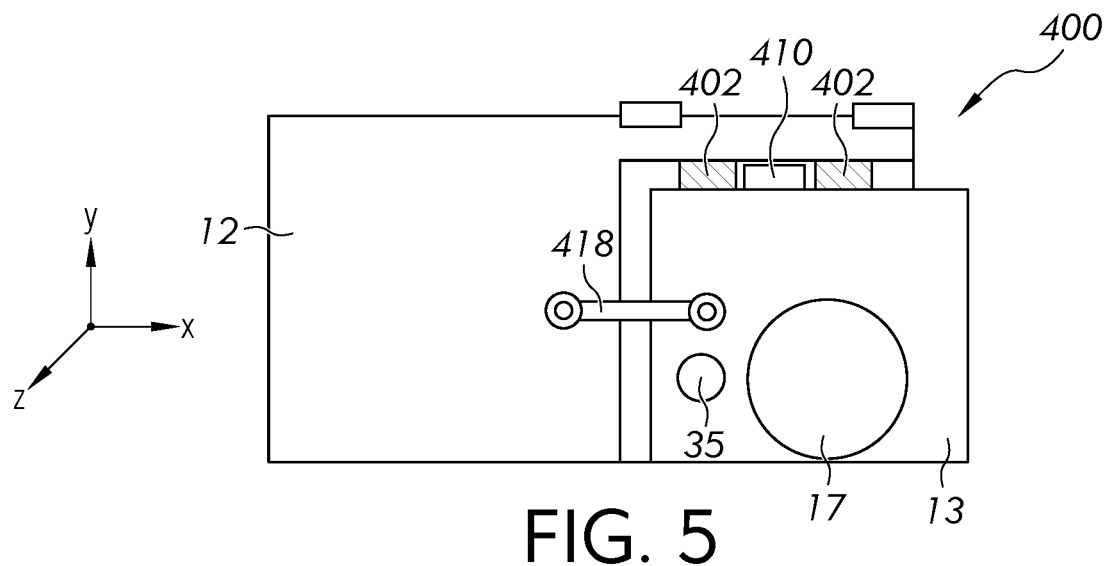
FIG. 5 is a side view of a second isolation system for the work vehicle of FIG. 1 having a rear frame and a front frame.
Figure 6:
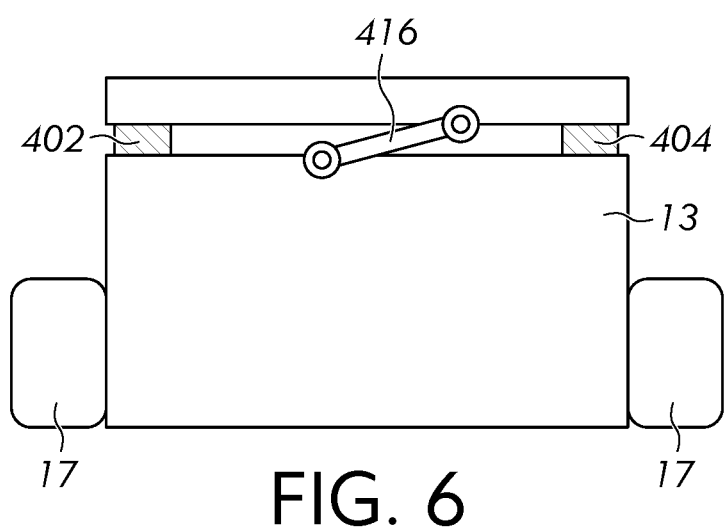
FIG. 6 is an end view of the FIG. 5 embodiment.

Turning now to FIGS. 5 and 6, is an isolation system 400 similar to the isolation system 10. The isolation system 400 includes a first pair of isolating devices 402 positioned and spaced apart from each other along the longitudinal axis X and along the left side of the work vehicle 11 as defined by the lateral axis Z. The isolation system 400 includes a second pair of the isolating devices 404 positioned and spaced apart from each other along the longitudinal axis X and along the right side of the work vehicle 11 as defined by the lateral axis Z. The isolating devices 402 and 404 are similar to isolating devices 102. The isolating devices 402 and 404 can be arranged in any configuration that is beneficial to absorbing forces or loads applied to the work vehicle 11 and noise resultant therefrom. In this embodiment, the first and second pairs of isolating devices 402 and 404 are positioned to support the vertical forces from the total force applied to the work vehicle 11. The first and second pairs of isolating devices 402 and 404 allow movement of front frame 12 relative to the rear frame 13 in a vertical direction.

The isolation system 400 also includes a first force limiting device 410 positioned between the first pair of isolating devices 402. The isolation system 400 also includes a second force limiting device (not illustrated) positioned between the second pair of isolating devices 404. Alternatively, the first and second force limiting devices are positioned adjacent the isolating devices 402 and 404. The first force limiting device 410 and the second force limiting device are similar to first force limiting device 310. In this form, the first and second force limiting devices are each positioned to limit application of the vertical force that is applied to the first and the second pairs of isolating devices 402 and 404, respectively.

The isolation system 400 includes a first motion limiting torque rod 416 that attaches to the rear frame 13 and the front frame 12 and extends generally along the lateral axis Z. The isolation system 400 also includes a second motion limiting torque rod 418 that attaches to the rear frame 13 and the front frame 12 and extends generally along the longitudinal axis X. The first and second motion limiting torque rods 416 and 418 are similar to motion limiting torque rod 316. The first motion limiting torque rod 416 is configured to prevent movement of the rear frame 13 in the lateral direction relative to the front frame 12. The second motion limiting torque rod 418 is configured to prevent movement of the rear frame 13 in the longitudinal direction relative to the front frame 12.

Figure 7:
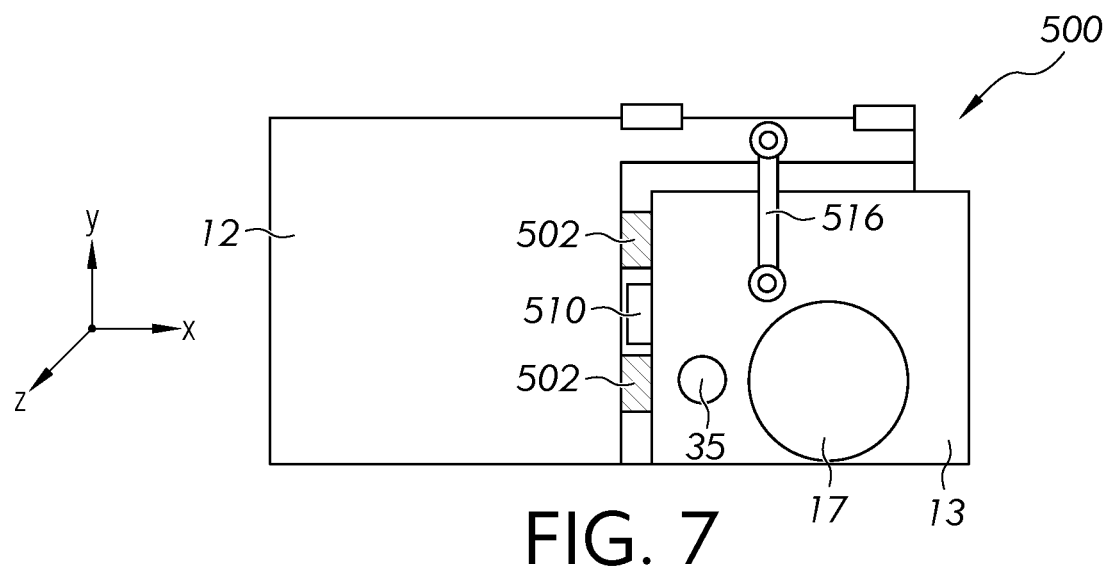
FIG. 7 is a side view of a third isolation system for the work vehicle of FIG. 1 having a rear frame and a front frame.
Figure 8:
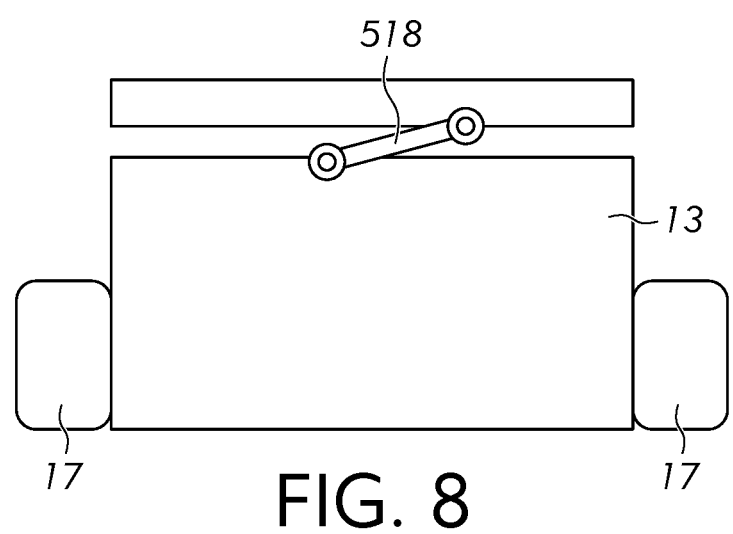
FIG. 8 is an end view of the FIG. 7 embodiment.

Turning now to FIGS. 7 and 8, is an isolation system 500 similar to the isolation system 10. The isolation system 500 includes a first pair of isolating devices 502 positioned and spaced apart from each other along the vertical axis Y between the front frame 12 and the rear frame 13. The isolation system 500 includes a second pair of the isolating devices 504 positioned and spaced apart from each other along the lateral axis Z between the front frame 12 and the rear frame 13. The isolating devices 502 and 504 are similar to isolating devices 102. The isolating devices 502 and 504 can be arranged in any configuration that is beneficial to absorbing forces or loads applied to the work vehicle 11 and noise resultant therefrom. In this embodiment, the first pair of isolating devices 502 is positioned to support the longitudinal forces from the total force applied to the work vehicle 11. The first pair of isolating devices 502 allow movement of front frame 12 relative to the rear frame 13 in a longitudinal direction. The second pair of isolating devices 504 is positioned to support the longitudinal forces from the total force applied to the work vehicle 11. The second pair of isolating devices 504 allow movement of front frame 12 relative to the rear frame 13 in a vertical direction.

The isolation system 500 also includes a first force limiting device 510 positioned between the first pair of isolating devices 502. The first force limiting device 510 is similar to first force limiting device 310. In this form, the first force limiting device 510 is positioned to limit application of the longitudinal force that is applied to the first pair of isolating devices 502.

The isolation system 500 includes a first motion limiting torque rod 516 that attaches to the rear frame 13 and the front frame 12 and extends generally along the vertical axis Y. The isolation system 500 also includes a second motion limiting torque rod 518 that attaches to the rear frame 13 and the front frame 12 and extends generally along the lateral axis Z. The first and second motion limiting torque rods 516 and 518 are similar to motion limiting torque rod 316. The first motion limiting torque rod 516 is configured to prevent movement of the rear frame 13 in the vertical direction relative to the front frame 12. The second motion limiting torque rod 418 is configured to prevent movement of the rear frame 13 in the lateral direction relative to the front frame 12.

In another form, one or more of the isolating devices 102 can be positioned in alternative arrangements such as a V-shape or an L-shape. For example in a V-shape configuration a pair of isolating devices 102 are positioned on a 45 degree line relative to the rear frame 13 which would allow the front frame 12 to move up and down at 45 degrees. In the V-shape configuration, there would be required one motion limiting torque rod positioned to constrain motion in the lateral direction. The torque rods limit movement in the axes from which they are placed. Additional force limiting devices 104 and motion limiting torque rods 106 can be positioned in alternative arrangements as discussed herein.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An isolation system for a work vehicle having a rear frame operably attached to a front frame; the work vehicle having a vertical axis, a lateral axis, and a longitudinal axis, the isolation system for the work vehicle comprising:
    at least one isolating device positioned between the rear frame and the front frame, the at least one isolating device configured to support at least one of a longitudinal force or a vertical force from a total force applied to the work vehicle during operation of the work vehicle;
    a force limiting device positioned near the at least one isolating device and between the rear frame and the front frame, the force limiting device configured to prevent a force from an axis in which the force limiting device is aligned from being applied to the at least one isolating device; and
    a motion limiting torque rod attached directly to both of the rear frame and the front frame, the motion limiting torque rod configured to prevent movement of the rear frame in the lateral direction relative to the front frame.

2. The isolation system of claim 1, further comprising:
    a second isolating device positioned to support the other one of the longitudinal force or the vertical force.

3. The isolation system of claim 2, further comprising:
    a second force limiting device positioned near the second isolating device.

4. The isolation system of claim 1, wherein the force limiting device is configured to limit application of either the longitudinal force or the vertical force that is applied to the at least one isolating device.

5. The isolation system of claim 1, further comprising:
    a rear frame configured to support a greater portion of a total force during operation of the work vehicle than the front frame.

6. The isolation system of claim 1, wherein the at least one isolating device includes a rubber isolating device.

7. A work vehicle having a vertical axis, a lateral axis, and a longitudinal axis, the work vehicle having a front frame, the work vehicle comprising:
    a rear frame configured to support a total force applied to the work vehicle during operation of the work vehicle, the rear frame attached to the front frame;
    an isolation system mounted between the rear frame and the front frame, the isolation system including:
    one or more isolating devices positioned between the rear frame and the front frame, the one or more isolating devices configured to support at least one of a longitudinal force or a vertical force from the total force applied to the work vehicle;
    a force limiting device positioned adjacent the one or more isolating devices and between the rear frame and the front frame, the force limiting device being aligned with an axis, the force limiting device configured to prevent an axial force from the total force that corresponds with the axis in which the force limiting device is aligned from being applied to the one or more isolating devices; and
    a motion limiting torque rod attached directly to and between the rear frame and the front frame, the motion limiting torque rod configured to limit movement of the rear frame in one of a lateral direction, a longitudinal direction, or a vertical direction relative to the front frame.

8. The work vehicle of claim 7, wherein the one or more isolating devices includes two isolating devices positioned to support the vertical force.

9. The work vehicle of claim 8, wherein the force limiting device is positioned between the two isolating devices.

10. The work vehicle of claim 8, wherein the force limiting device is positioned offset from the two isolating devices.

11. The work vehicle of claim 7, wherein the one or more isolating devices includes a second isolating device positioned to support the longitudinal force.

12. The work vehicle of claim 11, further comprising:
    a second force limiting device positioned adjacent the second isolating device.

13. The work vehicle of claim 7, wherein the rear frame is configured to support a greater portion of the total force applied to the work vehicle during operation than the front frame is configured to support.

14. The work vehicle of claim 7, wherein the force limiting device is configured to limit application of either the longitudinal force or the vertical force that is applied to the one or more isolating devices.

15. The work vehicle of claim 7, wherein the force limiting device includes one of a mechanical hard stop or a rubber bumper.

16. An isolation system for a work vehicle having a rear frame operably attached to a front frame, the work vehicle having a vertical axis, a lateral axis, and a longitudinal axis, the isolation system comprising:
    one or more isolating devices positioned between the rear frame and the front frame, each of the one or more isolating devices having an isolating device axis wherein each of the one or more isolating devices is configured to enable movement of the rear frame relative to the front frame in a direction along the corresponding isolating device axis during operation of the work vehicle;
    a motion limiting torque rod attached directly to both of the rear frame and the front frame, the motion limiting torque rod configured to prevent movement of the rear frame in a direction other than the isolating device axis relative to the front frame; and
    a force limiting device is positioned near the one or more isolating devices and between the rear frame and the front frame.

17. The isolation system of claim 16, wherein the one or more isolating devices includes a second isolating device that has a second isolating device axis, wherein the second isolating device axis is different than the first isolating device axis of the one of more isolating devices.

18. The isolation system of claim 17, further comprising:
    a second force limiting device positioned adjacent to the second isolating device.

19. The isolation system of claim 16, further comprising:
    a rear frame configured to support a greater portion of a total force applied to the work vehicle during operation of the work vehicle than the front frame.

20. The isolation system of claim 16, wherein each of the one or more isolating devices is configured to support a force in a direction along the isolating device axis from a total force during operation of the work vehicle.

* * * * *